(12) United States Patent
Xing

(10) Patent No.: US 12,037,088 B2
(45) Date of Patent: Jul. 16, 2024

(54) CATAMARAN CENTRALIZED-TRANSPORTATION FISHING SHIP AND CONTROL METHOD

(71) Applicant: Yunxiong Xing, Tianjin (CN)

(72) Inventor: Yunxiong Xing, Tianjin (CN)

(73) Assignee: Yunxiong Xing, Tianjin (CN)

( * ) Notice: Subject to any disclaimer, the term of this patent is extended or adjusted under 35 U.S.C. 154(b) by 430 days.

(21) Appl. No.: 17/578,532

(22) Filed: Jan. 19, 2022

(65) Prior Publication Data

US 2023/0192247 A1   Jun. 22, 2023

(30) Foreign Application Priority Data

Dec. 20, 2021   (CN) .......................... 202111563665.X

(51) Int. Cl.
| | | |
|---|---|---|
| *B63B 35/16* | (2006.01) | |
| *A01K 73/06* | (2006.01) | |
| *B63B 1/12* | (2006.01) | |

(52) U.S. Cl.
CPC .............. *B63B 35/16* (2013.01); *A01K 73/06* (2013.01); *B63B 1/121* (2013.01)

(58) Field of Classification Search
CPC .......... B63B 35/16; B63B 1/121; A01K 73/06
See application file for complete search history.

(56) References Cited

U.S. PATENT DOCUMENTS

| | | | | |
|---|---|---|---|---|
| 1,606,668 | A * | 11/1926 | Rubach ................... | A01K 79/00 43/6.5 |
| 9,961,887 | B2 * | 5/2018 | Ma ........................... | A01K 75/00 |
| 2012/0048168 | A1 * | 3/2012 | Wilson .................... | B63B 35/18 440/38 |

FOREIGN PATENT DOCUMENTS

| | | | | |
|---|---|---|---|---|
| CN | 105599868 | | 5/2016 | |
| CN | 110796900 | | 2/2020 | |
| CN | 106719492 B | * | 5/2020 | ............. A01K 80/00 |
| CN | 213125591 | | 5/2021 | |
| WO | WO-2006050676 A1 | * | 5/2006 | ............. B63B 1/121 |

* cited by examiner

*Primary Examiner* — S. Joseph Morano
*Assistant Examiner* — Jovon E Hayes
(74) *Attorney, Agent, or Firm* — Nitin Kaushik

(57) ABSTRACT

The present invention provides a catamaran centralized-transportation fishing ship and a control method, which relate to the technical field of fishing of fishing ships. The catamaran centralized-transportation fishing ship has the fishing assembly and the concave chamber for centralized transportation of fish bodies, which can simultaneously have two functions of fishing and centralized transportation, and has a wide application range. Compared with existing fishing ships for fishing operations, the fishing ship can place the caught fish bodies in the concave chamber, so that the fish bodies can be in original water quality during a transfer process, and thus a survival rate of the fish bodies is increased. Meanwhile, setting of the limiting mechanism can prevent the fish bodies from escaping and increase a fishing amount of a single fishing operation.

10 Claims, 4 Drawing Sheets

CATAMARAN CENTRALIZED-TRANSPORTATION FISHING SHIP AND CONTROL METHOD

RELATED APPLICATION

This application claims the benefit of priority of Chinese Patent Application No. 202111563665.X, filed on Dec. 20, 2021, the contents of which are incorporated herein by reference in their entirety.

FIELD AND BACKGROUND OF THE INVENTION

The present invention relates to the technical field of fishing of fishing ships, in particular to a catamaran centralized-transportation fishing ship and a control method.

Fishing ships are ships used to catch and harvest aquatic animals and plants and also include some auxiliary ships for modern fishing production, such as those for aquatic product processing, transportation, breeding, resource investigation, fishery guidance and training, and execution of fishery administration tasks.

There are different classification methods for fishing ships. Based on operation waters, the ships can be divided into marine fishing ships and freshwater fishing ships, and marine fishing ships are further divided into coastal, offshore and ocean fishing ships. Based on hull materials, the ships can be divided into wooden, steel, glass steel, aluminum alloy, steel mesh cement fishing ships and various mixed-structure fishing ships. Based on propulsion modes, the ships can be divided into motor, sail and manual fishing ships. Based on tasks undertaken by the fishing ships, those ships can be divided into two categories: fishing ships for fishing and fishery auxiliary ships.

Most of the existing fishing ships do not have two functions of fishing and centralized transportation, and their application range is small, in addition to a low survival rate of caught fish bodies.

SUMMARY OF THE INVENTION

The purpose of the present invention is to provide a catamaran centralized-transportation fishing ship, which solves shortcomings of the prior art. The catamaran centralized-transportation fishing ship comprises a fishing assembly and a concave chamber for centralized transportation of fish bodies, can simultaneously have two functions of fishing and centralized transportation, and has a wide application range and a high survival rate of the fish bodies.

Another purpose of the present invention is to provide a control method of the catamaran centralized-transportation fishing ship, which solves shortcomings of the prior art and has all the beneficial effects of the catamaran centralized-transportation fishing ship.

An embodiment of the present invention is realized as follows:

The embodiment of the present application provides a catamaran centralized-transportation fishing ship, comprising:

a ship body, which comprises a bow, a hull and a stern, wherein the bow, the hull and the stern cooperate with each other to form a concave chamber with a fish inlet at one side; and a fishing assembly, which comprises a fishing net and a limiting mechanism, wherein the fishing net and the limiting mechanism are both arranged in the concave chamber, and the limiting mechanism is arranged to open and close the fish inlet.

The catamaran centralized-transportation fishing ship has a fishing assembly and a concave chamber for centralized transportation of fish bodies, which can simultaneously have two functions of fishing and centralized transportation, and has a wide application range. Compared with existing fishing ships for fishing operations, the fishing ship can place the caught fish bodies in the concave chamber, so that the fish bodies can be in original water quality during a transfer process, and thus a survival rate of the fish bodies is increased. Meanwhile, setting of a limiting mechanism can prevent the fish bodies from escaping and increase a fishing amount of a single fishing operation.

Further, wherein the fishing net is arranged at the bottom side of the concave chamber, and the fishing net and the limiting mechanism can cooperate with each other to partition the concave chamber to form a fish collecting chamber with an upward opening and an underwater chamber with a downward opening.

Further, wherein a forward projection of the fishing net towards the cross section of the concave chamber and a forward projection of the cross section of the concave chamber coincide with each other.

A forward projection of a fishing net towards the cross section of the concave chamber and a forward projection of the cross section of the concave chamber coincide with each other, that is, the fishing net can be vertically arranged on a side wall of the concave chamber or obliquely arranged on the side wall of the concave chamber, so as to prevent a joint between the fishing net and the concave chamber from having a gap and prevent carps from escaping from the concave chamber.

Further, wherein the limiting mechanism comprises a first electric door and a second electric door;

the second electric door is arranged at a side far away from the fish inlet, and the second electric door can partition the fish collecting chamber to form a fish storage chamber and a transfer chamber; and the first electric door is arranged at one side close to the fish inlet, and can move in the transfer chamber along an extending direction of the concave chamber.

Further, wherein the hull comprises two hull units, which are respectively connected with two sides of the stern and are arranged in parallel with each other;

the bow comprises two bow units, the bow units and the hull units are in one-to-one correspondence and mutually adapted, and the bow units and the sides of the hull units away from the stern are connected with each other.

Further, wherein any one of the bow units has an inclined surface, and the two inclined surfaces of the two bow units are oppositely arranged;

the fish inlet comprises a big end and a small end extending outward along the inclined surfaces, the small end faces the concave chamber, and the big end faces away from the concave chamber.

Further, wherein the bow unit is internally provided with a fore peak;

the hull unit is internally provided with a first load adjusting cabin, a cabin, an oil cabin, a storage cabin and a second load adjusting cabin in turn;

an after peak is arranged in the bow unit.

Further, wherein the hull unit is provided with lifting equipment which passes through the concave chamber for loading and unloading of live fish.

In some embodiments of the present invention, a stern is provided with a cab, and a driving mode of the ship may be an electric mode.

Another purpose of the present invention is to provide a control method of a catamaran centralized-transportation fishing ship, wherein the catamaran centralized-transportation fishing ship comprises a ship body and a fishing assembly, the ship body comprises a bow, a hull and a stern, and the bow, the hull and the stern cooperate with each other to form a concave chamber with a fish inlet at one side; the fishing assembly comprises a fishing net and a limiting mechanism, the fishing net and the limiting mechanism are both arranged in the concave chamber, and the limiting mechanism is arranged to open and close the fish inlet; and the control method comprises the following steps:

S1, opening a first electric door, closing a second electric door, and monitoring the quantity of live fish in a transfer chamber in real time;

S2, when the quantity of the live fish is greater than a preset number, opening the second electric door, closing the first electric door, and controlling the first electric door to move towards the second electric door to a position of the second electric door;

S3, closing the second electric door, opening the first electric door, and controlling the first electric door to move to a position of the fish inlet; and S4, repeating the above steps.

Compared with the prior art, the embodiment of the present invention has at least the following advantages or beneficial effects:

1) The catamaran centralized-transportation fishing ship has the fishing assembly and the concave chamber for centralized transportation of fish bodies, which can simultaneously have two functions of fishing and centralized transportation, and has a wide application range;

2) Compared with existing fishing ships for fishing operations, the fishing ship can place the caught fish bodies in the concave chamber, so that the fish bodies can be in original water quality during a transfer process, and thus a survival rate of the fish bodies is increased. Meanwhile, setting of the limiting mechanism can prevent the fish bodies from escaping and increase a fishing amount of a single fishing operation.

DESCRIPTION OF SPECIFIC EMBODIMENTS OF THE INVENTION

Figure 1:
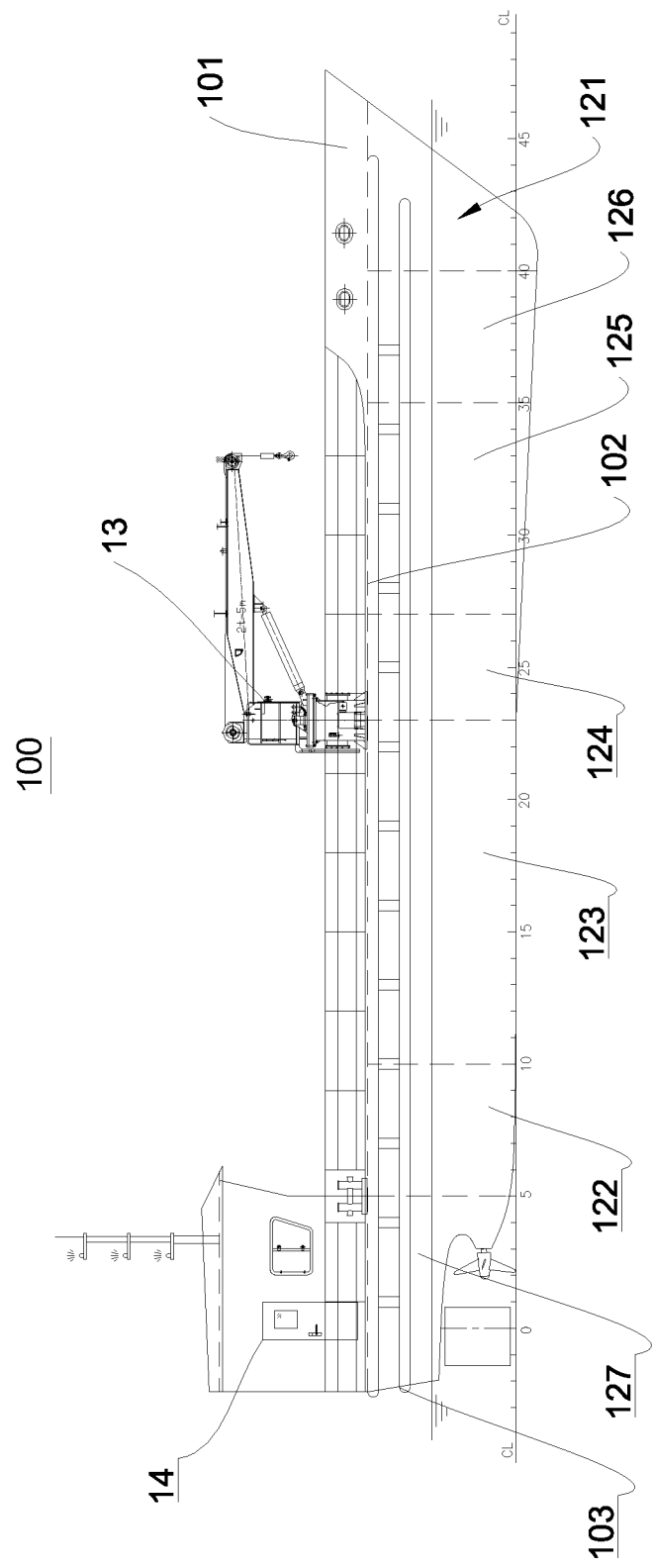
FIG. 1 is a front view of a catamaran centralized-transportation fishing ship provided by an embodiment of the present invention.
Figure 2:
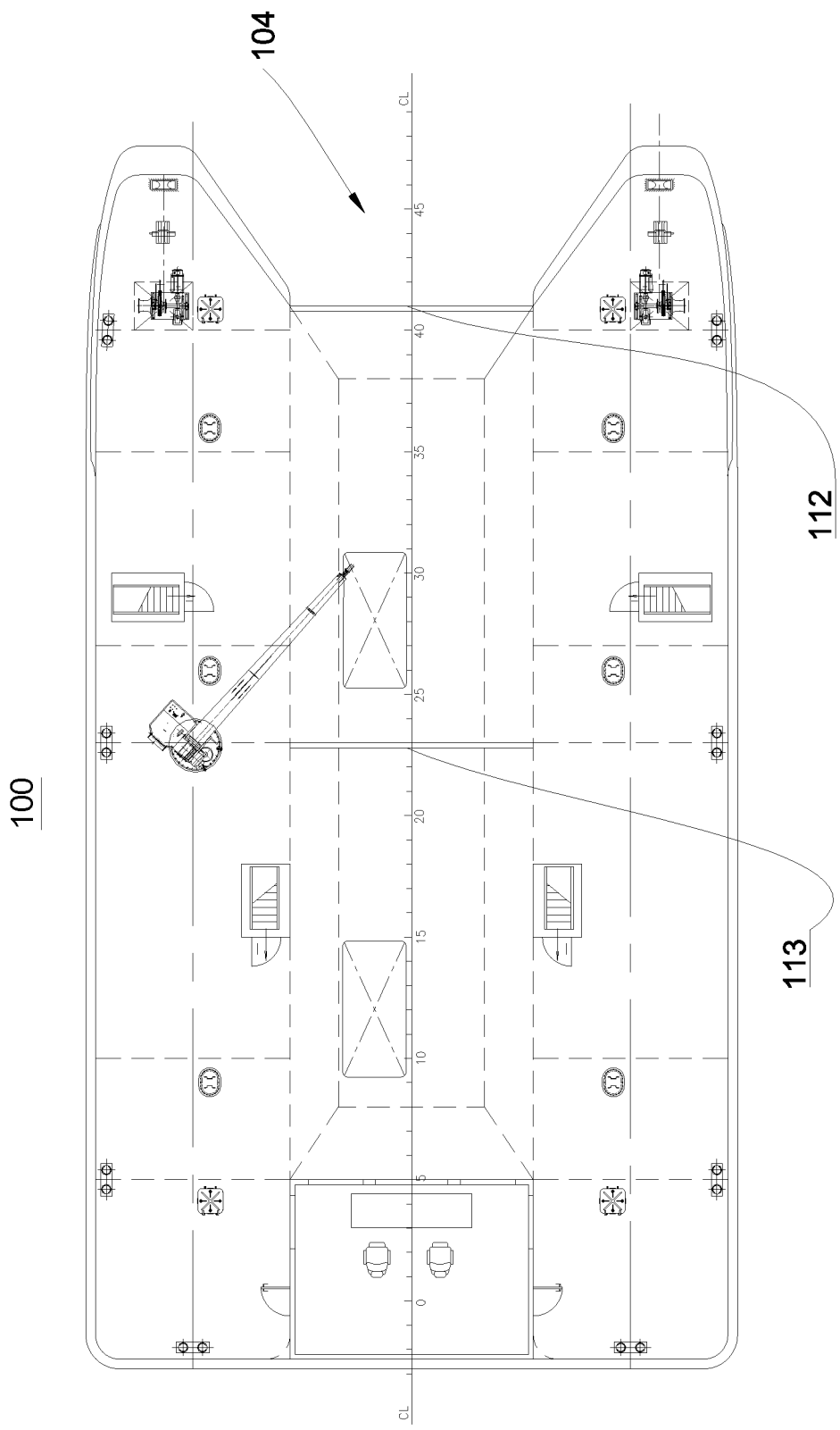
FIG. 2 is a top view of a catamaran centralized-transportation fishing ship provided by an embodiment of the present invention.

Please refer to FIGS. 1-4, in which FIG. 1 is a front view of a catamaran centralized-transportation fishing ship 100 provided by the present invention, and FIG. 2 is a top view of a catamaran centralized-transportation fishing ship 100 provided by an embodiment of the present invention. The catamaran centralized-transportation fishing ship 100 comprises a ship body and a fishing assembly. The ship body comprises a bow, a hull and a stern 103, wherein the bow, the hull and the stern 103 cooperate with each other to form a concave chamber 104 with a fish inlet on one side. The fishing assembly comprises a fishing net 111 and a limiting mechanism, wherein the fishing net 111 and the limiting mechanism are both arranged in the concave chamber 104, and the limiting mechanism is arranged to open and close the fish inlet.

It is worth noting that the catamaran centralized-transportation fishing ship 100 has the fishing assembly and the concave chamber 104 for centralized transportation of fish bodies, which can simultaneously have two functions of fishing and centralized transportation, and has a wide application range. Compared with existing fishing ships for fishing operations, the fishing ship can place the caught fish bodies in the concave chamber 104, so that the fish bodies can be in original water quality during a transfer process, and thus a survival rate of the fish bodies is increased. Meanwhile, setting of the limiting mechanism can prevent the fish bodies from escaping and increase a fishing amount of a single fishing operation.

It is also worth noting that this catamaran centralized-transportation fishing ship 100 is mainly used to catch Asian carps in North America. Asian carp is a Cyprinidae fish of the Asian origin, which is the general name proposed by Americans for black carp, grass carp, bighead carp, silver carp, crucian carp and carp. Generally, carps prefer foraging in shallow waters. Fishing with the catamaran centralized-transportation fishing ship 100 can ensure that the caught fish bodies can be temporarily stored in the concave chamber 104 for a long time (the concave chamber 104 is connected with the shallow waters in rivers), thereby increasing the survival rate of the fish bodies and preventing the fish bodies from dying during transportation.

The catamaran centralized-transportation fishing ship 100 is especially suitable for fishing in places where fish and fish schools are flooding, such as Asian carp in Mississippi River where millions of pounds of fishes are often concentrated, which can greatly save the labor cost. When a water temperature rises to a certain degree, silver carps will start foraging and movement on a water surface that is 1-2 m deep. The present invention can automatically collect the silver carps on the surface without any manual assistance. Even if there is only one captain and a pilot on board, they can catch a large number of fish.

Figure 4:
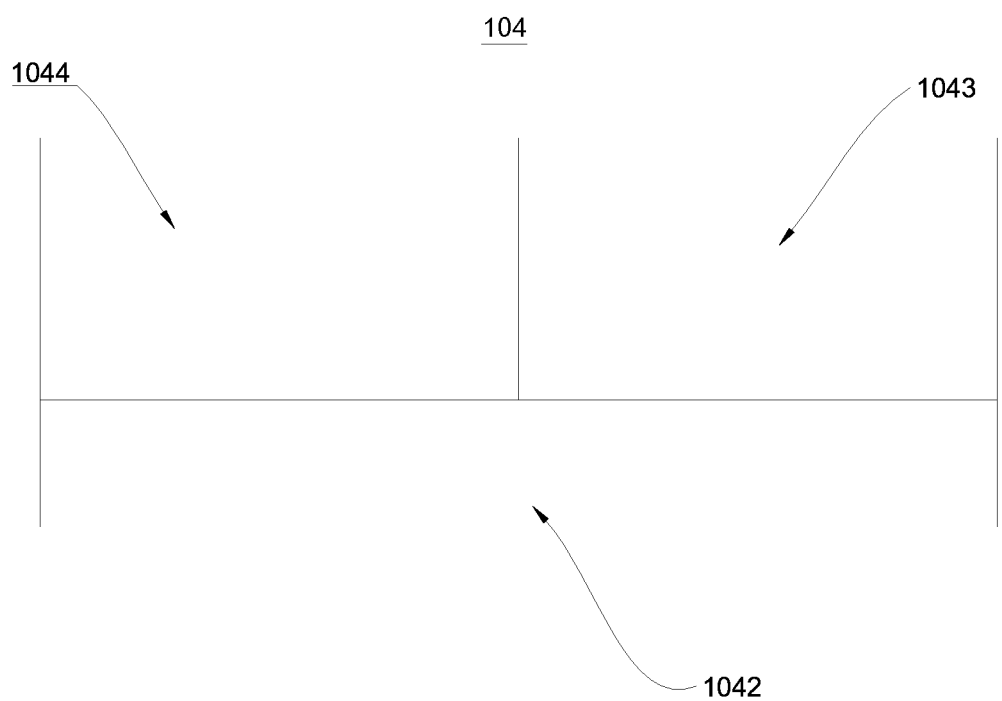
FIG. 4 is a sectional view of a concave chamber provided by an embodiment of the present invention.

Please refer to FIG. 4, which is a sectional view of the concave chamber 104 provided by an embodiment of the present invention. The fishing net 111 is arranged at the bottom side of the concave chamber 104, and the fishing net 111 and the limiting mechanism can cooperate with each other to partition the concave chamber 104 to form a fish collecting chamber 1041 with an upward opening and an underwater chamber 1042 with a downward opening.

It is worth noting that the fishing net 111 is arranged at the bottom side of the concave chamber 104, which can effectively ensure that the fish bodies move underwater at a depth of 0-10 m, prevent an ultra-deep depth of the fishing net 111 from reducing the structural strength thereof, and meanwhile prevent the fish in deep water from entering the fish collecting chamber 1041, so that fishing specificity is higher and fishing efficiency is higher.

It should also be noted that a mesh aperture of the fishing net 111 is 5 cm-10 cm. Preferably, the mesh aperture may be 8 cm. At this time, meshes of the fishing net 111 can not only ensure the fishing efficiency, but can also conform to local legal management norms of the fishing net 111, so as to avoid catching of young fry and achieve long-term ecological recycling and ecological balance. It can be understood that, based on different specific implementation environments, the mesh aperture of the fishing net 111 may also be 5 cm, 6 cm, 9 cm, etc. The present embodiment does not constitute a limitation on the mesh aperture of the fishing net 111, but is only an example of a specific value thereof.

Figure 3:
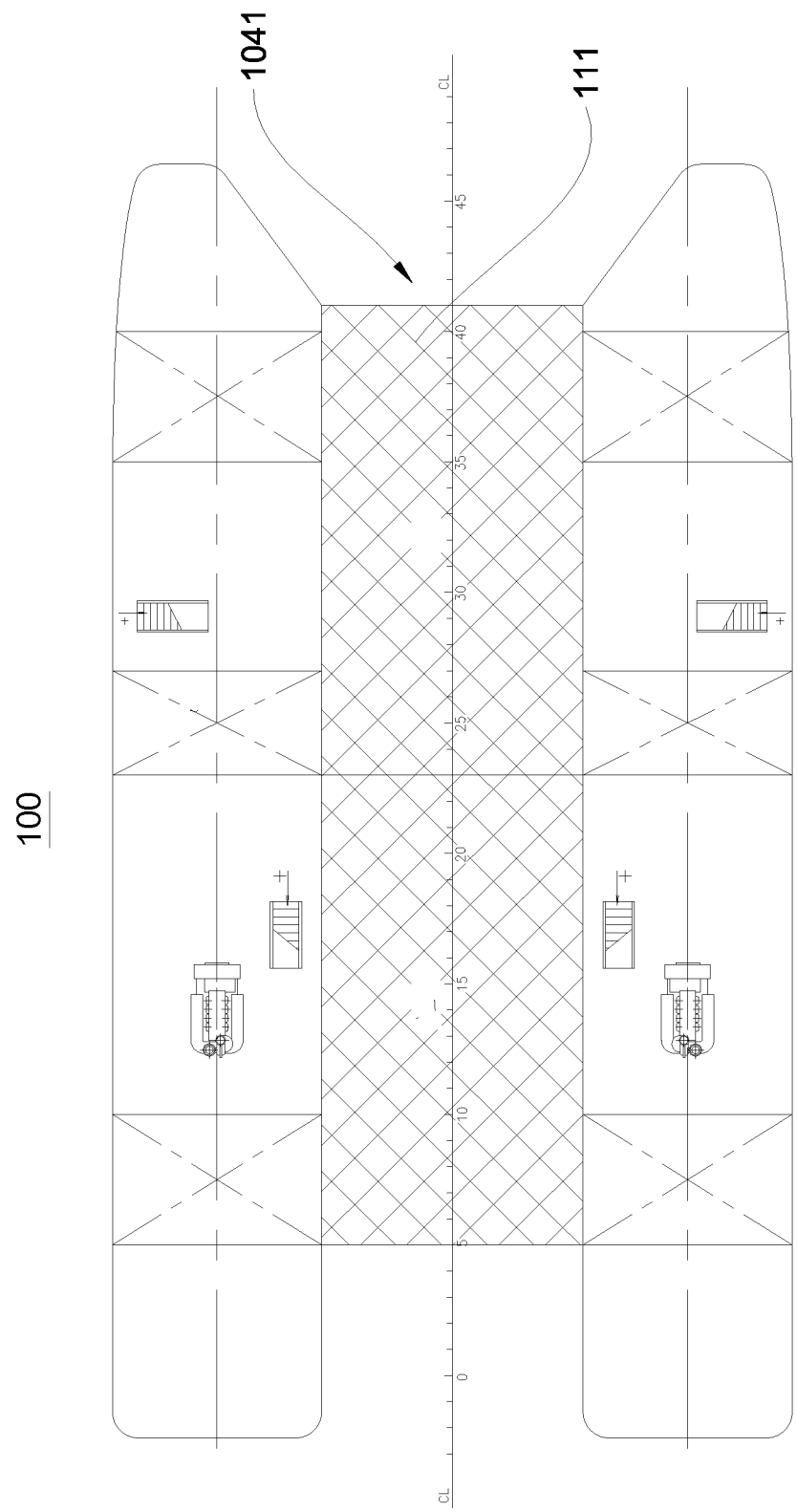
FIG. 3 is a bottom view of a catamaran centralized-transportation fishing ship provided by an embodiment of the present invention.

Meanwhile, referring to FIG. 3, the mesh of the fishing net 111 is a square hole. Compared with a special-shaped hole, the square hole has a more stable structure and is simpler in manufacture and lower in production cost. It can be understood that the mesh shape of the fishing net 111 may be triangular or circular based on the specific implementation environment, and the present embodiment does not limit the mesh shape of the fishing net 111.

Please refer to FIGS. 2-4 at the same time, a forward projection of the fishing net 111 towards the cross section of the concave chamber 104 and a forward projection of the cross section of the concave chamber 104 coincide with each other.

It is worth noting that the forward projection of the fishing net 111 towards the cross section of the concave chamber 104 and the forward projection of the cross section of the concave chamber 104 coincide with each other, that is, the fishing net 111 can be vertically arranged on a side wall of the concave chamber 104 or obliquely arranged on the side wall of the concave chamber 104, so as to prevent a joint between the fishing net 111 and the concave chamber 104 from having a gap and prevent carps from escaping from the concave chamber 104.

Please refer to FIG. 2, the limiting mechanism comprises a first electric door 112 and a second electric door 113. The second electric door 113 is arranged at a side far away from the fish inlet, and the second electric door 113 can partition the fish collecting chamber 1041 to form a fish storage chamber 1043 and a transfer chamber 1044. The first electric door 112 is arranged at a side close to the fish inlet, and can move in the transfer chamber 1044 along an extending direction of the concave chamber 104.

It is worth noting that the first electric door 112 and the second electric door 113 can cooperate with each other to form the fish storage chamber 1043 and the transfer chamber 1044, which can separate the fish bodies of the fishing ship during transportation, and can collect and store the caught fish bodies during continuous fishing, thus reducing an escape phenomenon of the fish bodies and improving the fishing efficiency.

Optionally, the hull comprises two hull units 102, which are respectively connected with two sides of the stern 103 and are arranged in parallel with each other;

The bow comprises two bow units 101, the bow units 101 and the hull units 102 are in one-to-one correspondence and mutually adapted, and the bow units 101 and the sides of the hull units 102 away from the stern 103 are connected with each other.

Specifically, the two hull units 102 cooperate to form a double-body structure, so that during operation, the concave chamber 104 can be formed to play roles in fishing and temporary storage. The two hull units 102 are arranged parallel to each other, which can make the catamaran centralized-transportation fishing ship 100 realize stable transportation, reduce the impact of water flows and facilitate navigation.

Meanwhile, the arrangement of the bow units 101 can form a fore peak 121, thus facilitating the operation of the ship body. As a ballast tank, the fore peak 121 can be used to adjust a floating state. Under a normal loading condition, stern tilting is serious due to concentration of machinery and equipment and superstructures in the area of the after peak 123. The fore peak plays a role in preventing excessive stern tilting and ensuring normal navigation of the ship.

Please refer to FIG. 2 and FIG. 3 again, any one of the bow units 101 has an inclined surface, and the two inclined surfaces of the two bow units 101 are oppositely arranged;

The fish inlet comprises a big end and a small end extending outward along the inclined surfaces, the small end faces the concave chamber 104, and the big end faces away from the concave chamber 104.

It is worth noting that the fish inlet with the big end facing outward is more conducive to entry of external fish schools, thus improving the fishing efficiency.

In the present embodiment, the bow unit 101 is internally provided with the fore peak 121;

the hull unit 102 is internally provided with a first load adjusting cabin 122, a cabin 123, an oil cabin 124, a storage cabin 125 and a second load adjusting cabin 126 in turn; and an after peak 127 is arranged in the bow unit 101.

It can be understood that the first load adjusting cabin 122 and the second load adjusting cabin 126 are generally located at the double bottom or both sides of the ship, which can be used to ballast a water body, ensure stability of ship navigation, and prevent the center of gravity of the ship from shifting. The after peak 127 refers to a cabin located behind a last watertight bulkhead at the stern of the ship and below a bulkhead deck or a watertight platform of the after peak 127. Ribs of the stern 103 structure are closely spaced, and rib plates are thicker and higher than those of the fore peak 121. Panting beams and side stringers are added, and swash bulkheads are added in the cabin. The cabin is commonly used as a ballast tank or a fresh water tank. In addition to hydrostatic pressures, the stern of the ship also bears the weight of a rudder and propellers, as well as the hydrodynamic effects and vibration caused by rotation of the propellers.

In the present embodiment, the hull unit 102 is provided with a lifting device 13 which passes through the concave chamber 104 for loading and unloading of live fish.

In the present embodiment, the stern 103 is provided with a cab 14.

It is worth noting that the catamaran centralized-transportation fishing ship 100 is a backward-steering hull, and steering motion thereof is reflected at the rear end. During steering, the bow cannot move, that is, the center of the circle, and the stern 103 swings freely from left to right. In order to observe safety of the ship body, it is naturally necessary for a driver to lean back as far as possible for observation. Therefore the cab 14 is arranged at the stern 103. Meanwhile, propellers in the ship body are located at the stern 103, which can reduce arrangement of many pipelines.

Optionally, the concave chamber may also transport and store fish caught by other fishing tools (such as sticky nets, large cages, trawls, dropping nets, enclosure, etc.) in the original water quality in a living form, which is convenient for keeping freshness of the fish during factory processing.

Another embodiment of the present invention further comprises a control method of the catamaran centralized-transportation fishing ship 100. The catamaran centralized-transportation fishing ship 100 comprises the ship body and the fishing assembly, wherein the ship body comprises the bow, the hull and the stern 103, and the bow, the hull and the stern 103 cooperate with each other to form the concave chamber 104 with the fish inlet at one side; the fishing assembly comprises the fishing net 111 and the limiting mechanism, the fishing net 111 and the limiting mechanism are both arranged in the concave chamber 104, and the limiting mechanism is arranged to open and close the fish inlet. The control method comprises the following steps:

S1, opening the first electric door 112, closing the second electric door 113, and monitoring the quantity of the live fish in the transfer chamber 1044 in real time;

S2, when the quantity of the live fish is greater than a preset number, opening the second electric door 113, closing the first electric door 112, and controlling the first electric door 112 to move towards the second electric door 113 to a position of the second electric door 113;

S3, closing the second electric door 113, opening the first electric door 112, and controlling the first electric door 112 to move to a position of the fish inlet; and S4, repeating the above steps.

To sum up, the catamaran centralized-transportation fishing ship 100 comprises the ship body and the fishing assembly. The ship body comprises the bow, the hull and the stern 103, wherein the bow, the hull and the stern 103 cooperate with each other to form the concave chamber 104 with the fish inlet on one side. The fishing assembly comprises the fishing net 111 and the limiting mechanism, the fishing net 111 and the limiting mechanism are both arranged in the concave chamber 104, and the limiting mechanism is arranged to open and close the fish inlet. The catamaran centralized-transportation fishing ship 100 has the fishing assembly and the concave chamber 104 for centralized transportation of the fish bodies, which can simultaneously have two functions of fishing and centralized transportation, and has a wide application range. Compared with existing fishing ships for fishing operations, the fishing ship can place the caught fish bodies in the concave chamber 104, so that the fish bodies can be in original water quality during a transfer process, and thus a survival rate of the fish bodies is increased. Meanwhile, setting of the limiting mechanism can prevent the fish bodies from escaping and increase a fishing amount of a single fishing operation.

What is claimed is:

1. A catamaran centralized-transportation fishing ship, comprising:
    a ship body, which comprises a bow, a hull and a stern, wherein the bow, the hull and the stern cooperate with each other to form a concave chamber with a fish inlet at one side; and
    a fishing assembly, which comprises a fishing net and a limiting mechanism, wherein the fishing net and the limiting mechanism are both arranged in the concave chamber, and the limiting mechanism is arranged to open and close the fish inlet.

2. The catamaran centralized-transportation fishing ship according to claim 1, wherein the fishing net is arranged at the bottom side of the concave chamber, and the fishing net and the limiting mechanism can cooperate with each other to partition the concave chamber to form a fish collecting chamber with an upward opening and an underwater chamber with a downward opening.

3. The catamaran centralized-transportation fishing ship according to claim 2, wherein a forward projection of the fishing net towards the cross section of the concave chamber and a forward projection of the cross section of the concave chamber coincide with each other.

4. The catamaran centralized-transportation fishing ship according to claim 2, wherein the limiting mechanism comprises a first electric door and a second electric door;
    the second electric door is arranged at a side far away from the fish inlet, and the second electric door can partition the fish collecting chamber to form a fish storage chamber and a transfer chamber; and
    the first electric door is arranged at one side close to the fish inlet, and can move in the transfer chamber along an extending direction of the concave chamber.

5. The catamaran centralized-transportation fishing ship according to claim 1, wherein the hull comprises two hull units, which are respectively connected with two sides of the stern and are arranged in parallel with each other;
    the bow comprises two bow units, the bow units and the hull units are in one-to-one correspondence and mutually adapted, and the bow units and the sides of the hull units away from the stern are connected with each other.

6. The catamaran centralized-transportation fishing ship according to claim 5, wherein any one of the bow units has an inclined surface, and the two inclined surfaces of the two bow units are oppositely arranged;
    the fish inlet comprises a big end and a small end extending outward along the inclined surfaces, the small end faces the concave chamber, and the big end faces away from the concave chamber.

7. The catamaran centralized-transportation fishing ship according to claim 5, wherein the bow unit is internally provided with a fore peak;
    the hull unit is internally provided with a first load adjusting cabin, a cabin, an oil cabin, a storage cabin and a second load adjusting cabin in turn;
    an after peak is arranged in the bow unit.

8. The catamaran centralized-transportation fishing ship according to claim 5, wherein the hull unit is provided with lifting equipment which passes through the concave chamber for loading and unloading of live fish.

9. The catamaran centralized-transportation fishing ship according to claim 1, wherein the stern is provided with a cab.

10. A control method of a catamaran centralized-transportation fishing ship, wherein the catamaran centralized-transportation fishing ship comprises a ship body and a fishing assembly, the ship body comprises a bow, a hull and a stern, and the bow, the hull and the stern cooperate with each other to form a concave chamber with a fish inlet at one side; the fishing assembly comprises a fishing net and a limiting mechanism, the fishing net and the limiting mechanism are both arranged in the concave chamber, and the limiting mechanism is arranged to open and close the fish inlet; and the control method comprises the following steps:
    S1, opening a first electric door, closing a second electric door, and monitoring the quantity of live fish in a transfer chamber in real time;
    S2, when the quantity of the live fish is greater than a preset number, opening the second electric door, closing the first electric door, and controlling the first electric door to move towards the second electric door to a position of the second electric door;
    S3, closing the second electric door, opening the first electric door, and controlling the first electric door to move to a position of the fish inlet; and
    S4, repeating the steps of S1-S3.

* * * * *